United States Patent [19]

Huret, deceased et al.

[11] 4,445,374

[45] May 1, 1984

[54] DISTANCE RECORDER FOR A TWO-WHEELED VEHICLE OR THE LIKE

[75] Inventors: Roger Huret, deceased, late of Nanterre, France; by Alain P. B. Huret, heir, Bougival, France

[73] Assignee: Huret et SES Fils, Nanterre, France

[21] Appl. No.: 354,595

[22] Filed: Mar. 4, 1982

[30] Foreign Application Priority Data

Mar. 9, 1981 [FR] France .................................. 81 04657

[51] Int. Cl.³ .............................................. G01P 1/02
[52] U.S. Cl. ........................................ 73/490; 73/493; 73/431
[58] Field of Search ................. 73/490, 493, 431, 519; 235/95 R, 103

[56] References Cited

U.S. PATENT DOCUMENTS 3,240,072  3/1966  Holbrook .......................... 73/519 X
3,498,139  3/1970  Powell ............................. 73/519

*Primary Examiner*—James J. Gill
*Attorney, Agent, or Firm*—Trexler, Bushnell & Wolters, Ltd.

[57] ABSTRACT

The recorder comprises a case of moulded plastics material which forms in its lower part a driving cable entrance which is externally screwthreaded and bearings in which a shaft carrying a magnet of a tachometer and transmission means can be respectively fitted. The case further comprises internal ribs for supporting a sheet which closes the case and is in one piece with flanges which support the shaft of an indicator needle of a speedometer and counting means of the distance recorder and guide the fitting of the assembly inside the case.

10 Claims, 4 Drawing Figures

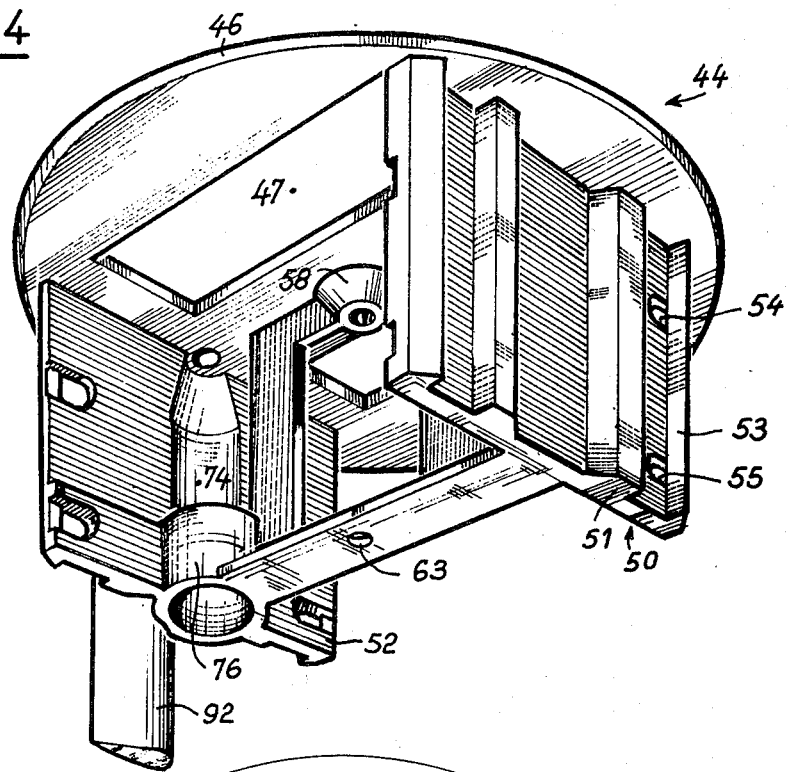
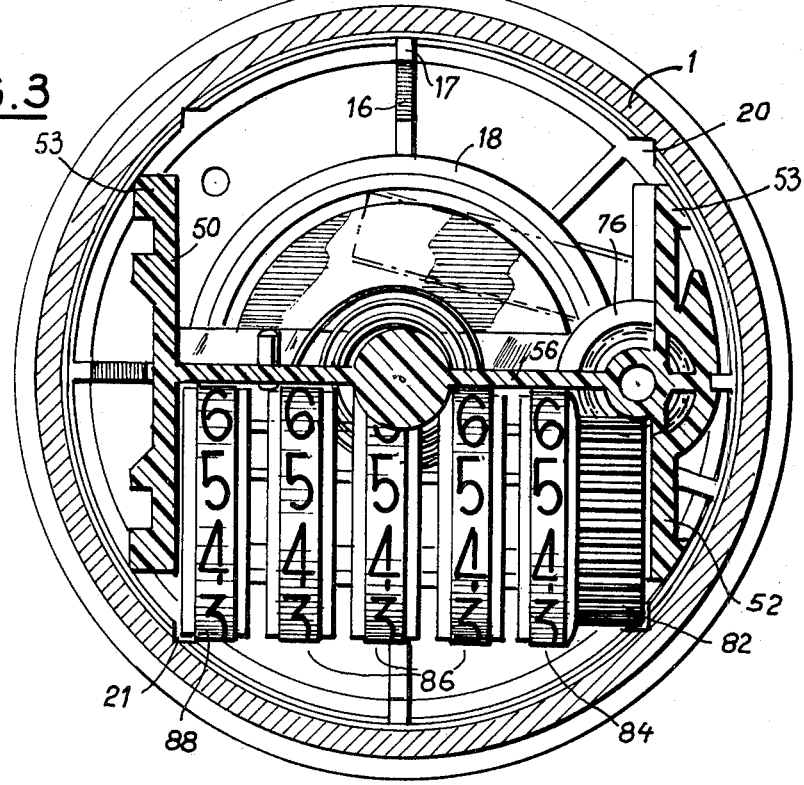

DISTANCE RECORDER FOR A TWO-WHEELED VEHICLE OR THE LIKE

DESCRIPTION

The distance recorders usually employed on two-wheeled vehicles or the like, and in particular kilometer recorders with a speedometer, usually comprise a cylindrical case in which are mounted a plurality of sub-assemblies and on which is fixed a dial. The assembly of these recorders therefore involves a large number of handling operations since it is first of all necessary to fix the various component parts of the sub-assemblies to each other and then introduce each of the assemblies in the case and fix it to the latter before fixing the dial. Consequently, the assembly of such recorders is a delicate operation and its cost is relatively high.

An object of the present invention is to overcome these drawbacks by facilitating both the assembly and the manufacture of a recorder of this type.

The invention therefore provides a recorder for a two-wheeled vehicle, or the like, and in particular a distance recorder with a speedometer, which comprises a moulded cylindrical case whose closed end is exteriorly extended by a driving cable entrance provided with fixing means, whereas its inner surface includes longitudinal reinforcing ribs which define support surfaces at their upper end, and at least two axial grooves; and a support for the mechanism comprising a sheet closing the case and provided with a centre aperture and at least one opening and two lateral depending flanges which exactly fit in the case and are provided with apertures for mounting therebetween the shafts of the counting means and a radial partition wall carrying two bearings which are coaxial with the support and are spaced apart.

The case arranged in this way may receive a part of the means constituting the counting mechanism, for example the support pin of the magnet of a magnetic tachometer, and the support carries all of the other parts of the counter. The support is mounted in the case by a simple sliding of these two elements which closely fit together, ie. in a single operation which is easy to automatize.

According to a preferred embodiment, the case comprises two half-bearings supporting the horizontal shaft of a motion transmitting means, one half-bearing being formed on the end wall of the case in the vicinity of the cable entrance, and the other half-bearing being formed on its lateral inner wall, and a bearing which supports the vertical shaft of a second transmission means, engaged with the first transmission means and is formed on the end wall of the case, the support comprising a bearing receiving the opposite end of said vertical shaft.

The adjustment of the position of the various parts is thus achieved by the simple fitting of the support in the case, and the shape of this support and the presence of clearance grooves in the wall of the case enable a minimum overall size to be given to the assembly.

The ensuing description of one embodiment of the invention which is given merely by way of example and illustrated in the accompanying drawings will bring out the advantages and features of the invention.

In the drawing:

FIG. 3 is a horizontal sectional view taken on line 3—3 of FIG. 2;

FIG. 4 is a perspective view of the support of the mechanism in the case.

Figure 1:
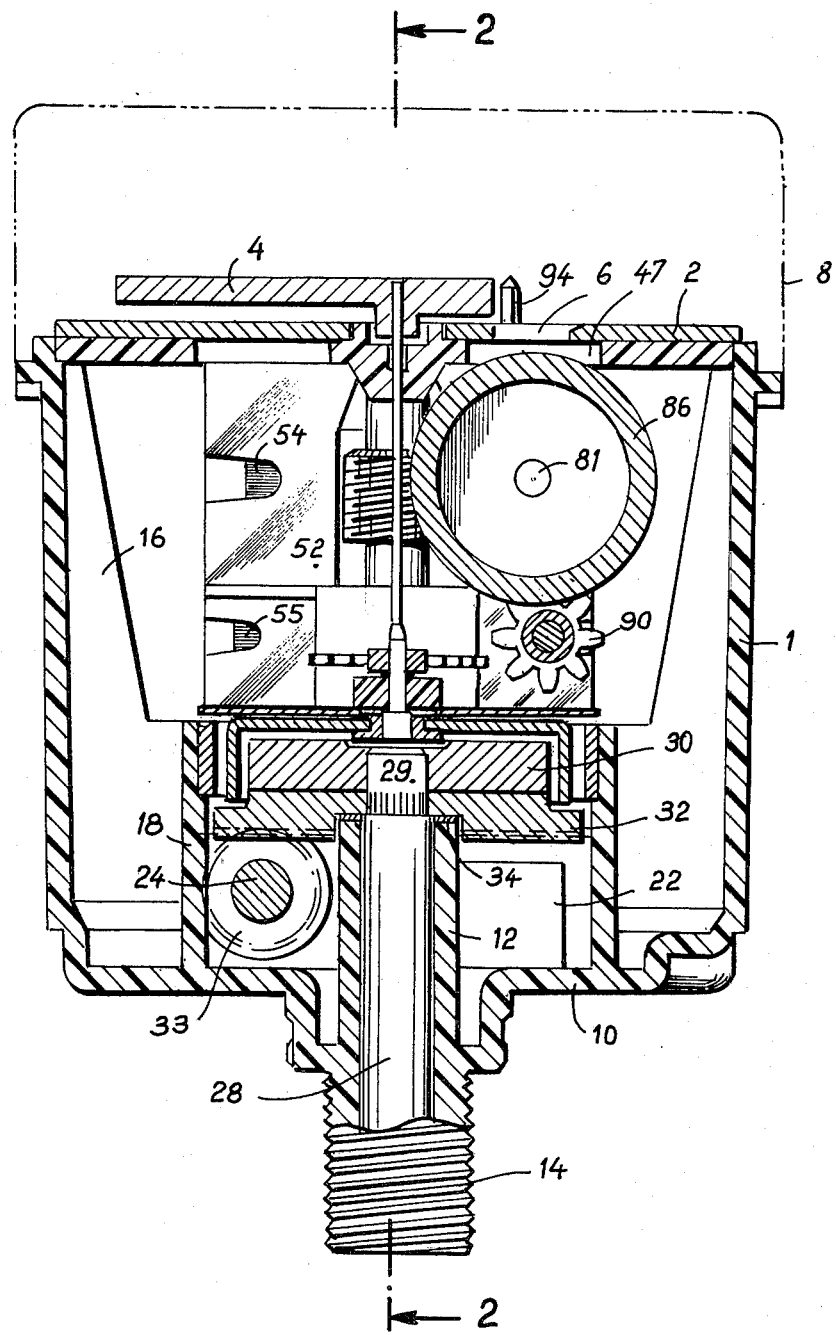
FIG. 1 is an axial sectional view of a distance recorder with a speedometer according to the invention.

The distance or kilometer recorder and speedometer shown in the drawings comprises, in the known manner, a case 1 of substantially cylindrical shape which carries a dial 2 over which moves a needle or pointer 4 indicating the speed and which is provided with an opening 6 for reading the kilometer recorder. A window 8, which is merely indicated by dot-dash lines in FIGS. 1 and 2, is secured to the case 1 in such manner as to protect the dial 2 and the needle 4.

Figure 2:
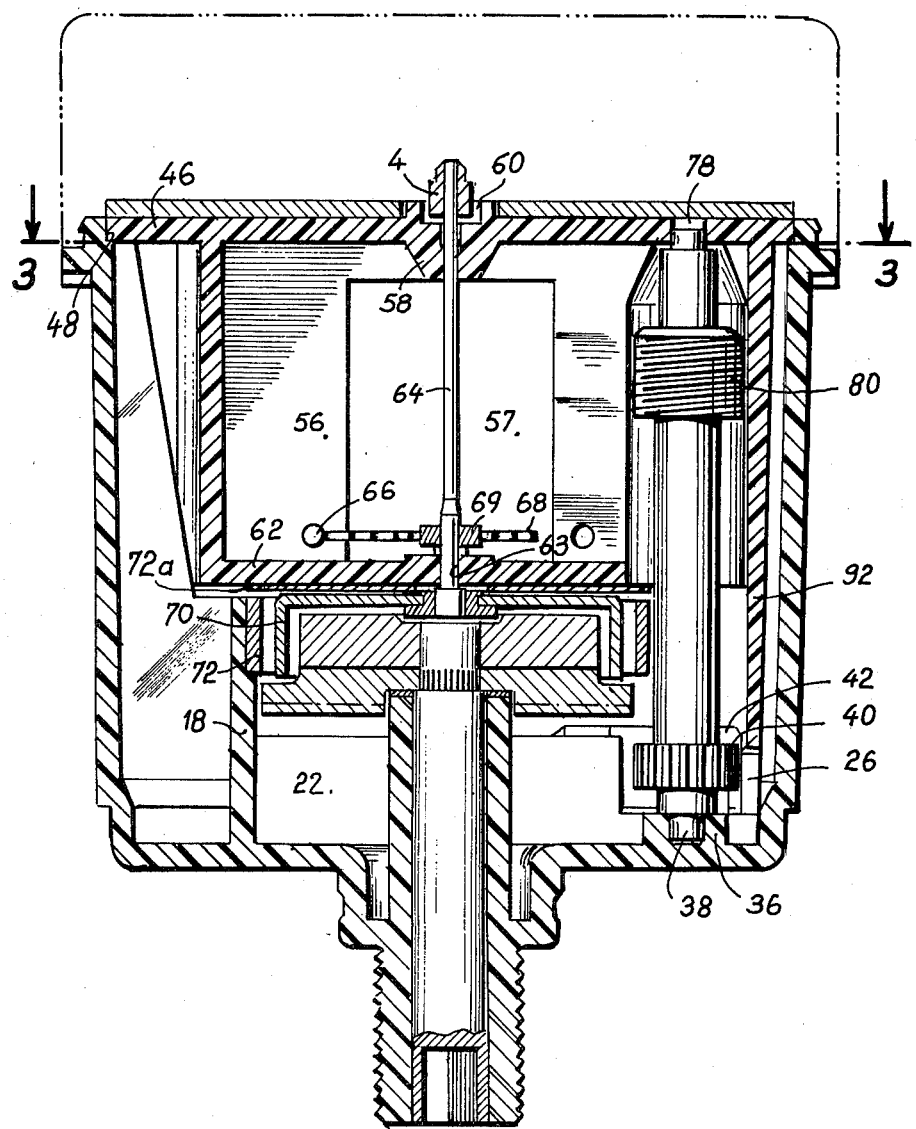
FIG. 2 is a sectional view taken on line 2—2 of FIG. 1.

As shown more particularly in FIGS. 1 and 2, the case 1 comprises at the end thereof opposed to the dial 2 an end wall 10 through which extends a tubular element 12 which extends inwardly and outwardly of the case and thus defines an entrance for the cable driving the recorder. The tubular element 12 is in one piece with the end wall 10 and the body 1 of the case and forms, on the outside of the latter, a fixing spigot 14 which is provided with a screwthread and/or other means for mounting the recorder.

Inside the case, radial ribs 16 connect the inner surface of the cylindrical wall to an annular sleeve 18 which is coaxial with the tubular element 12 and the case 1. The ribs 16 have a radial dimension which gradually decreases between the top of the sleeve 18 and the upper part of the case 1, but terminate at a slight distance below the end edge of this case in a planar bearing surface 17 (FIG. 3).

The inner surface of the case 1 comprises at least two longitudinal grooves 20, 21 which extend in a part of the height of the case and are preferably located on each side of a rib 16. In the embodiment shown in the drawings, the ribs 16 are four in number and the grooves 20, 21 are also four in number, each groove being placed in the space between two ribs. The grooves 20 and 21 have a triangular-shaped horizontal cross-section. The sleeve 18 is also connected to the tubular element 12 by radial reinforcing ribs 22. One of these ribs 22 includes an outwardly open U-shaped notch which constitutes a half-bearing for supporting the end portion of a spindle 24 of a transmission means. A second half-bearing 26 is formed on the inner surface of the case 1 (FIG. 2) for receiving the opposite end portion of the horizontal spindle 24, the sleeve 18 being locally interrupted to clear the transmission means.

The transmission means carried by the spindle 24 is drived by a rod 28 connected to the transmission cable and fitted in the tubular element 12. This rod 28 is rigid with a shaft 29 carrying a magnetized disc 30 which is rigid with a wheel 32 carrying in its lower part a spiral gear which engages with a gear wheel 33 carried by the driving shaft 24. A ring 34 interposed between the end of the tubular element 12 and a centre cavity in the wheel 32 forms a support thrust bearing and thus facilitates the rotation of the disc 30 and the wheel 32 relative to the tubular element 12.

The end wall 10 of the case 1 further comprises a bearing 36 supporting a vertical shaft 38 which is rigid with a gear pinion 40 which receives its motion from the driving shaft 24 through a worm 42 carried by this shaft. The bearing 36 and the two half-bearings supporting the shaft 24 are moulded in one piece with the case 1 and the sleeve 18.

Fitted in the case 1 is a support 44 which comprises, as shown more particularly in FIG. 4, a circular sheet 46 which bears against the bearing surfaces 17 of the ribs 16 of the support, and against an inner shoulder 48 of this case (FIG. 2). Depending from this sheet 46 are two flanges, respectively 50 and 52, having a substantially planar inner surface and an outer surface provided with reinforcing ribs 51 and ledges 53 projecting from the flanges and having an outer surface whose contour corresponds to that of the inner surface of the case against which they bear when the plate 44 is in position in the case, as shown in FIG. 3. Each of the flanges 50 and 52 further comprises, in the vicinity of each ledge 53, two spaced-apart apertures, respectively 54 and 55, which are in alignment on the two flanges so as to permit the mounting of shafts supporting the counting means.

In the preferred embodiment shown in the drawings, the two flanges 50 and 52 are substantially symmetrical with respect to a diametral plane of the support 44 and each comprises two pairs of apertures 54, 55, and the sheet 46 comprises two openings 47 on either side of the plane of symmetry of the flanges 50 and 52.

Extending from the flange 50 is a radial partition wall 56 which is rigid with the sheet 46 and is extended beyond the centre of this sheet 46 but is apertured in its centre part at 57 (FIG. 2). The partition wall 56 carries in its upper part a frustoconical bearing 58 through which extends an axial passage which communicates with an aperture 60 in the sheet 46. A bar 62 reinforces the lower edge of the partition wall 56 and includes a bearing 63 which is coaxial with the bearing 58 and guides, in association with the bearing 58, the shaft 64 of the needle 4 of the speedometer. A lug or pin 66 fixed in the partition wall 56 permits the mounting of one of the ends of a spiral return spring 68 whose other end is rendered rigid with the shaft 64 by a ring 69. The shaft 64 is moreover rigid with a cup 70 which is fixed to the end of the shaft opposed to the needle 4 and whose edge portion is interposed between the magnetized disc 30 and the sleeve 18, or, more precisely, between this magnetized disc and a metal ring 72 which closes the magnetic field and is fixed inside the sleeve 18. A field-closing sheet 72a is fixed under the bar 62 and faces the cup 70. Airgaps are provided between the disc and the cup and between the latter and the ring 72 so as to ensure an angular displacement of the cup, and consequently of the needle 4, when the magnet driven by the driving cable rotates.

The flange 52 includes in its middle portion a cavity 74 which is defined by a wall substantially in the shape of a portion of a cylinder and is open on the side adjacent to the flange 50. The partition wall 56 is interrupted so as to define a free space therebetween and the cavity 74. However, in the lower part of the partition wall 56, ie. in the vicinity of the bar 62, the partition wall 56 is connected to the flange 52 by two portions of a ring 76 which have the same radius as the cylindrical wall of the cavity 74. When the support 44 is fitted in the case 1, the ring 76 thus formed is coaxial with the bearing 36 and there extends therethrough the shaft 38 whose upper end portion is maintained in a bearing 78 formed in the sheet 46 and which carries a worm 80.

The worm 80 mounted on the shaft 38 transmits rotational motion of the driving cable to the counting wheels mounted between the flanges 50 and 52. Indeed, the worm 80 is engaged with a worm wheel 82 rotatably mounted on a shaft 81 fixed in the two aligned apertures 54 of the flanges 50 and 52. The driving wheel 82 is rigid with a first numbered wheel 84, but a plurality of other numbered wheels 86 and 88, namely four numbered wheels in the illustrated embodiment, are also rotatably mounted on the shaft carrying the wheel 82. The numbered wheel 84, in the same way as the three wheels 86, includes a lug for driving the following wheel. On the other hand, the last numbered wheel 88 has no driving lug of this type.

Below the numbered counting wheels 82 to 88, a second shaft extends through the apertures 55 of the two flanges 50 and 52 and carries spider members 90 which are laterally offset relative to the numbered wheels and engage, on one hand, the driving lug of one of the wheels and, on the other hand, teeth of the following wheel, so that each numbered wheel 86, 88 is advanced one number each time the preceding wheel has effected a complete rotation.

The relative position of the apertures 55 and 54 and of the openings 47 is so chosen that the shaft 81 of the numbered wheels is located substantially in the middle of the opening 47 and consequently the numbers carried by the numbered wheels can be seen through this opening.

As the flanges 50 and 52 have two series of apertures 55 and 54 which are symmetrical relative to a diametral plane of the sheet 46, and in the same way this sheet 46 has two openings 47, all of the counting means may be mounted in two different positions relative to this plane of symmetry, without necessity to modifying the position of the shaft 38 carrying the worm 80 and the gear pinion 40.

Irrespective of the position chosen, the assembly of the counting means essentially comprises a stack of elements in the case. Indeed, the assembly comprising the magnetized disc 30, the wheel 32 and the rod 28 is fitted in the tubular element 12 after the shaft 24 has been placed in the bearing of the end wall of the case. The position of these bearings with respect to the tubular element 12 is such that the wheel 32 and the pinion 33 automatically engage with each other when the magnet 30 is placed in position. The shaft 38 is then engaged in the bearing 36, this shaft being guided by the parts 74, 76. Then the assembly comprising the support 44 carrying the shaft 64 rigid with the cup 70, the counting wheels 86, 88, and the spider members 90, is inserted in the case 1 and urged inwardly until the sheet 46 bears against the upper bearing surfaces 17 of the ribs 16. The bearing 78 fits over the shaft 38 and the fitting of this assembly is guided by the reinforced edges 53 of the flanges 50 and 52. Moreover, the flange 52 is preferably provided with a guiding tab 92 which extends the outer wall of the ring 76 and ensures the precise positioning of the worm 42.

When the support 44 is in position in the case 1, the dial 2 can be mounted thereon, centering pins 94 facilitating this assembly, and then the needle 4 is fitted on the shaft 64. The window 8 can then be mounted. The plate 44 and the case 1 are made from a moulded plastics material so that the flanges 50, 52, the partition wall 56 and the sheet 46 are in a single piece. Further, the particular arrangement of the flanges 50 and 52 enables the counting means and speedometer to be mounted very close to each other without waste of space, the support 44 occupying practically the whole of the inner volume of the case 1.

The grooves 20 and 21 also serve to reduce the overall size of the case. Indeed, they constitute clearances for receiving the edge of the wheels, such as the driving gear wheel 82 and the end numbered wheel 88, as shown in FIG. 3.

The invention consequently provides a recorder of small overall size and light weight which may be assembled by simple handling operations capable of being effected in an automatic manner, which easily permits a mass-production of the recorder at relatively low cost.

As concerns the presence of the two openings 47 in the support 44, they enable the same case to be employed for the construction of recorders of different appearances and features. There may be provided:

as shown, a single counter in the lower part of the dial (FIG. 3);

or a counter in the upper part of the dial;

or two counters, one of which counters may be reset to zero for recording partial travelled distances or trips.

Having now described my invention what I claim as new and desire to secure by Letters Patent is:

1. A recorder for a two-wheeled vehicle or the like, comprising a moulded cylindrical case having a longitudinally extending axis and a closed end wall, means defining a driving cable entrance in said end wall, and a mechanism support, the case having an inner surface which defines reinforcing ribs which extend longitudinally of the case and each terminate in an upper end which defines a bearing surface, said inner surface also defining at least two grooves extending longitudinally of the case, said mechanism support comprising a sheet which bears against said bearing surfaces at the upper ends of the ribs, closes the case and defines a centre aperture and at least one opening, the mechanism support further comprising two lateral flanges which depend from said sheet and fit exactly in the case and are provided with apertures for mounting shafts of counting means located between said flanges, and a partition wall extending diametrally of the case and carrying two bearings which bearings are coaxial with each other and with the center aperture of said sheet and are axially spaced apart from each other.

2. A recorder according to claim 1, wherein the case comprises two half-bearings for supporting a horizontal shaft of a motion transmitting means, a first of said half-bearings being formed on a lateral surface of the case and the other half-bearing being in the vicinity of said cable entrance, and a bearing having an axis parallel to the axis of the case and located in the vicinity of the first half-bearing.

3. A recover according to claim 1, wherein the case comprises an inner sleeve coaxial with the case and radial ribs connecting the sleeve to the case.

4. A recorder according to claim 1, 2 or 3, wherein the two lateral flanges are substantially symmetrical with respect to a median plane thereof and comprise reinforced edge portions having an outer contour which fits an inner contour of the case.

5. A recorder according to any one of the claims 1 to 3, wherein the radial partition wall of the mechanism support is perpendicular to the two flanges and extends from one of the flanges beyond the centre of the support but is apertured in a centre part of the partition wall.

6. A recorder according to claim 1, wherein a middle portion of one of the flanges is curved into the shape of a portion of a cylinder and two portions of a ring connect a lower part of the portion of a cylinder to the partition wall.

7. A recorder according to claim 6, wherein the sheet of the mechanism support comprises a bearing which is coaxial with said portion of a cylinder of the corresponding flange and, after assembly of the support with the case, coaxial with a bearing on the end wall of the case.

8. A recorder according to any one of the claims 1 to 3, wherein the mechanism support comprises a guiding tab rigid with one of the flanges and projecting beyond said one of the flanges to the vicinity of bearings on the end wall of the case.

9. A recorder according to any one of the claims 1 to 3, comprising a shaft of a speedometer needle supported by said coaxial bearings, a transverse bar which reinforces a lower part of the radial partition wall and carries the lower bearing of said coaxial spaced-apart bearings, a pin carried by the partition wall, and a spiral return spring connected at one end of the spring to said shaft of the speedometer needle and at an opposite end of the spring to said pin.

10. A recorder according to any one of the claims 1 to 3, comprising a magnetic tachometer including a driving cable rotatably mounted in said cable entrance, a rod drivenly connected to said cable, a magnetized disc and a driving spiral gear coaxially rigid with said rod, a shaft carrying an indicator needle and extending through said two coaxial bearings carried by the partition wall, and a cup fixed to the needle-carrying shaft, and a kilometer counter comprising counting wheels mounted between the two flanges of the mechanism support, first transmission means drivingly connected to said counting wheels and comprising a vertical shaft mounted in a bearing carried by the end wall of the case and in a bearing carried by the support, and second transmission means comprising a horizontal shaft which is adjacent to the end wall of the case and is drivingly connected to to the shaft of the first transmission means and drivenly connected to the spiral gear.

* * * * *